US010144423B2

(12) United States Patent
Nakagawa et al.

(10) Patent No.: US 10,144,423 B2
(45) Date of Patent: Dec. 4, 2018

(54) DRIVING ASSISTANCE DEVICE FOR VEHICLE (71) Applicant: ADVICS CO., LTD., Kariya, Aichi-ken (JP)

(72) Inventors: Yusuke Nakagawa, Nagoya (JP); Yasuhito Ishida, Toyokawa (JP)

(73) Assignee: ADVICS CO., LTD., Kariya, Aichi-Ken (JP)

( * ) Notice: Subject to any disclaimer, the term of this patent is extended or adjusted under 35 U.S.C. 154(b) by 79 days.

(21) Appl. No.: 15/300,518

(22) PCT Filed: Mar. 31, 2015

(86) PCT No.: PCT/JP2015/060089
§ 371 (c)(1),
(2) Date: Sep. 29, 2016

(87) PCT Pub. No.: WO2015/152224
PCT Pub. Date: Oct. 8, 2015

(65) Prior Publication Data
US 2017/0174213 A1 Jun. 22, 2017

(30) Foreign Application Priority Data

Mar. 31, 2014 (JP) .................. 2014-072408

(51) Int. Cl.
*B60W 30/14* (2006.01)
*B60T 7/12* (2006.01)
(Continued)

(52) U.S. Cl.
CPC ........... *B60W 30/146* (2013.01); *B60T 7/042* (2013.01); *B60T 7/12* (2013.01); *B60T 8/17* (2013.01);
(Continued)

(58) Field of Classification Search
CPC ..... B60W 30/14; B60W 2520/28; B60T 8/17; B60T 7/12; B60T 8/32; B60T 2201/04
See application file for complete search history.

(56) References Cited

U.S. PATENT DOCUMENTS 5,941,614 A * 8/1999 Gallery .................. B60K 31/00
180/170

FOREIGN PATENT DOCUMENTS

JP         7-156683 A     6/1995
JP      H-10-507145 A     7/1998
(Continued)

OTHER PUBLICATIONS

International Search Report (PCT/ISA/210) dated Jul. 7, 2015, by the Japanese Patent Office as the International Searching Authority for International Application No. PCT/JP2015/060089.
(Continued)

*Primary Examiner* — Yonel Beaulieu
*Assistant Examiner* — Martin A Weeks
(74) *Attorney, Agent, or Firm* — Buchanan Ingersoll & Rooney PC (57) ABSTRACT This brake ECU executes vehicle downhill control for adjusting the braking force to be applied to a vehicle by actuating a brake actuator such that the vehicle body speed does not exceed a target speed. Also, in cases where the accelerator pedal is being operated in a state where the vehicle downhill control is being executed, the brake ECU changes the target speed such that, the longer the operation duration which is the duration for which the accelerator is operated, the higher the target speed.

13 Claims, 7 Drawing Sheets (51) Int. Cl.
  *B60T 8/17* (2006.01)
  *B60T 8/32* (2006.01)
  *B60T 7/04* (2006.01)
(52) U.S. Cl.
  CPC ............ *B60T 8/32* (2013.01); *B60T 2201/04* (2013.01); *B60W 2520/28* (2013.01)

(56) References Cited

FOREIGN PATENT DOCUMENTS

| JP | 2010-23565 A | 2/2010 |
| JP | 2011-230551 A | 11/2011 |

OTHER PUBLICATIONS

Written Opinion (PCT/ISA/237) dated Jul. 7, 2015, by the Japanese Patent Office as the International Searching Authority for International Application No. PCT/JP2015/060089.

* cited by examiner

DRIVING ASSISTANCE DEVICE FOR VEHICLE

TECHNICAL FIELD

The present invention relates to a driving assistance device for a vehicle.

BACKGROUND ART

As driving assistance control executed by a vehicle driving on a dirt road which is an unpaved road surface, vehicle downhill control such as DAC (Downhill Assistant Control) is known. In the vehicle downhill control, a brake actuator is actuated to prevent a vehicle body speed of the vehicle from exceeding a target speed (for example, 5 km/h) so as to adjust braking force to be applied to the vehicle.

Even though the vehicle downhill control is executed in a vehicle driving on a downhill slope, the driver of the vehicle may execute an accelerator operation. In this case, in a driving assistance device described in Patent Literature 1, a target speed is set to increase in accordance with an increase in accelerator operation amount by a driver. In this manner, even in execution of vehicle downhill control, a vehicle body speed of the vehicle can be increased depending on the intention of the driver who executes the accelerator operation.

When a downhill slope on which a vehicle drives is steep, a decrease in braking force of the vehicle may cause the vehicle to be rapidly accelerated under the influence of gravity acting on the vehicle. For this reason, in execution of vehicle downhill control, even though a driver executes the accelerator operation to increase the vehicle body speed of the vehicle, the accelerator operation amount may be very small. In this case, even though the driver executes the accelerator operation, the vehicle body speed of the vehicle is difficult to increase because the target speed does not increase.

The vehicle downhill control may be executed not only when the vehicle drives on a sloping road but also when the vehicle drives on a snowy road. Even though the driver executes the accelerator operation in execution of the vehicle downhill control when the vehicle is driving on a snowy road, the accelerator operation amount may be very small. In such a case, even though the driver executes the accelerator operation as in driving of the vehicle on a downhill slope, the vehicle body speed of the vehicle is difficult to increase because the target speed does not increase.

CITATIONS LIST

Patent Literature

Patent Literature 1: Japanese Translation of PCT Application Publication No. H10-507145

SUMMARY OF THE INVENTION

Technical Problems

It is an object of the present invention to provide a driving assistance device for a vehicle which can appropriately increase the vehicle body speed of a vehicle when a driver executes an accelerator operation even in a situation where braking force is being applied to the vehicle in execution of driving assistance control.

Solutions to Problems

In order to solve the problem, the driving assistance device for a vehicle includes a braking control unit which actuates a brake actuator to prevent the vehicle body speed of a vehicle from exceeding a target speed so as to adjust braking force to be applied to the vehicle; and a target speed determination unit which, in cases where the accelerator operation is being executed in a state where the braking control unit is executing the driving assistance control, determines a target speed such that, the longer an operation time which is a time for which the accelerator operation is executed, the higher the target speed.

According to the above configuration, when the driver executes the accelerator operation in execution of the driving assistance control, the target speed is set such that, the longer an operation time which is a time for which the accelerator operation is executed, the higher the target speed. For this reason, even though an accelerator operation amount is small, the vehicle body speed of the vehicle is set to be high by elongating the operation time. Thus, the vehicle body speed of the vehicle can be appropriately increased when a driver executes the accelerator operation even in a situation where braking force is being applied to the vehicle in execution of the driving assistance control.

It can be determined that the longer the operation time, the higher the vehicle body speed required by the driver. Thus, in the driving assistance device for a vehicle, the target speed determination unit preferably determines an increase of the target speed per unit time such that, the longer the operation time, the larger the increase of the target speed per unit time. According to the configuration, a driver can drive the vehicle at a vehicle body speed depending on the intention of the driver who executes the accelerator operation even in execution of the driving assistance control.

For example, the driving assistance device for a vehicle may include a time determination unit which determines an additional amount of the target speed such that, the longer the operation time, the larger the additional amount. In this case, the target speed determination unit preferably determines a sum of the additional amount of the target speed determined by the time determination unit and a determined set speed as the target speed. With the control configuration described above, control can be performed such that, the longer the operation time for the accelerator operation in execution of the driving assistance control, the higher the target speed.

When an accelerator operation amount in execution of the driving assistance control is small, an additional amount of the target speed is increased depending on the operation time of the accelerator operation to make it possible to increase the target speed. On the other hand, an accelerator operation amount obtained by a driver who wants to rapidly increase the vehicle body speed of the vehicle easily increases. In this manner, even though the accelerator operation amount is relatively large, when the target speed is determined depending on the operation time, the vehicle body speed required by the driver easily deviates from the actual vehicle body speed of the vehicle.

Thus, the driving assistance device for a vehicle may include a time determination unit which determines a first additional amount serving as an additional amount of the target speed such that, the longer the operation time, the larger the first additional amount, and an operation amount determination unit which determines a second additional amount serving as an additional amount of the target speed such that, the larger the accelerator operation amount in a situation where the braking control unit is executing the driving assistance control, the larger the second additional amount. The target speed determination unit preferably determines a sum of a larger one of the first additional amount determined by the time determination unit and the second additional amount determined by the operation amount determination unit and the determined set speed as the target speed.

According to the configuration described above, when an accelerator operation amount is small, the second additional amount is unlikely larger than the first additional amount. For this reason, the target speed is determined depending on the operation time for the accelerator operation. For this reason, when the accelerator operation amount is small, the vehicle body speed of the vehicle can be gradually increased. On the other hand, when an accelerator operation amount is large, the second additional amount is likely larger than the first additional amount. For this reason, the target speed is determined depending on the accelerator operation amount. For this reason, when the accelerator operation amount is large, the vehicle body speed of the vehicle can be rapidly increased according to a request of a driver.

In this case, it is assumed that the set speed is determined depending on a vehicle body speed correlated to at least one wheel speed of wheel speeds of a plurality of wheels mounted on the vehicle. In this case, when a driving road surface of a vehicle in which driving assistance control is executed is changed from a downhill slope to a climbing road, the vehicle body speed considerably decreases under the influence of gravity acting on the vehicle, and the set speed may considerably decrease. At this time, a target speed calculated based on the set speed also decreases. In this case, even though the driving road surface is changed into a climbing road, the vehicle body speed of the vehicle is almost equal to the target speed, and braking force applied to the vehicle by actuation of the brake actuator does not easily decrease. As a result, even though the driver executes the accelerator operation when the vehicle drives on the climbing road connected to the downhill slope, the vehicle body speed of the vehicle is possibly considerably decreasing.

Thus, the driving assistance device for a vehicle preferably includes a set speed determination unit which determines a set speed depending on a larger value of a vehicle body speed correlated with at least one wheel speed of wheel speeds of a plurality of wheels mounted on the vehicle and a set lower-limit speed when an accelerator operation is executed. With the configuration, when the driver executes the accelerator operation in execution of the driving assistance control, the set speed does not become lower than the lower-limit speed. More specifically, even though a road surface on which the vehicle drives changes from a downhill slope to a climbing road, the target speed does not become lower than the lower-limit speed. In this manner, since the target speed is prevented from being extremely low, when the road surface on which the vehicle drives changes from a downhill slope to a relatively steep climbing road, the vehicle body speed easily becomes lower than the target speed. When the vehicle body speed becomes lower than the target speed, braking force applied to the vehicle by actuation of the brake actuator decreases. When the braking force applied to the vehicle decreases as described above, the vehicle body speed does not easily decrease. Thus, when the road surface on which the vehicle drives changes from a downhill slope to a climbing road in a situation where braking force is being applied to the vehicle in execution of the driving assistance control, the vehicle can be caused to drive on the climbing road while suppressing considerable decrease of the vehicle body speed.

Note that the operation time is preferably a duration of an accelerator operation. According to the configuration, even though an accelerator operation amount in execution of the driving assistance control is small, the accelerator operation is continued to make it possible to increase the target speed. As a result, the driver executes the accelerator operation even in execution of the driving assistance control to make it possible to appropriately increase the vehicle body speed of the vehicle.

BRIEF DESCRIPTION OF THE DRAWINGS

FIGS. 3A to 3F are timing charts obtained when a road surface on which a vehicle drives changes from a downhill slope to a climbing road, in which

FIGS. 7A to 7G are timing charts obtained when a road surface on which a vehicle drives changes from a downhill slope to a climbing road, in which

FIGS. 8A to 8G are timing charts obtained when a vehicle drives on a downhill slope, in which

DESCRIPTIONS OF EMBODIMENT

An embodiment obtained by embodying a driving assistance device for a vehicle will be described below with reference to FIGS. 1 to 8.

Figure 1:
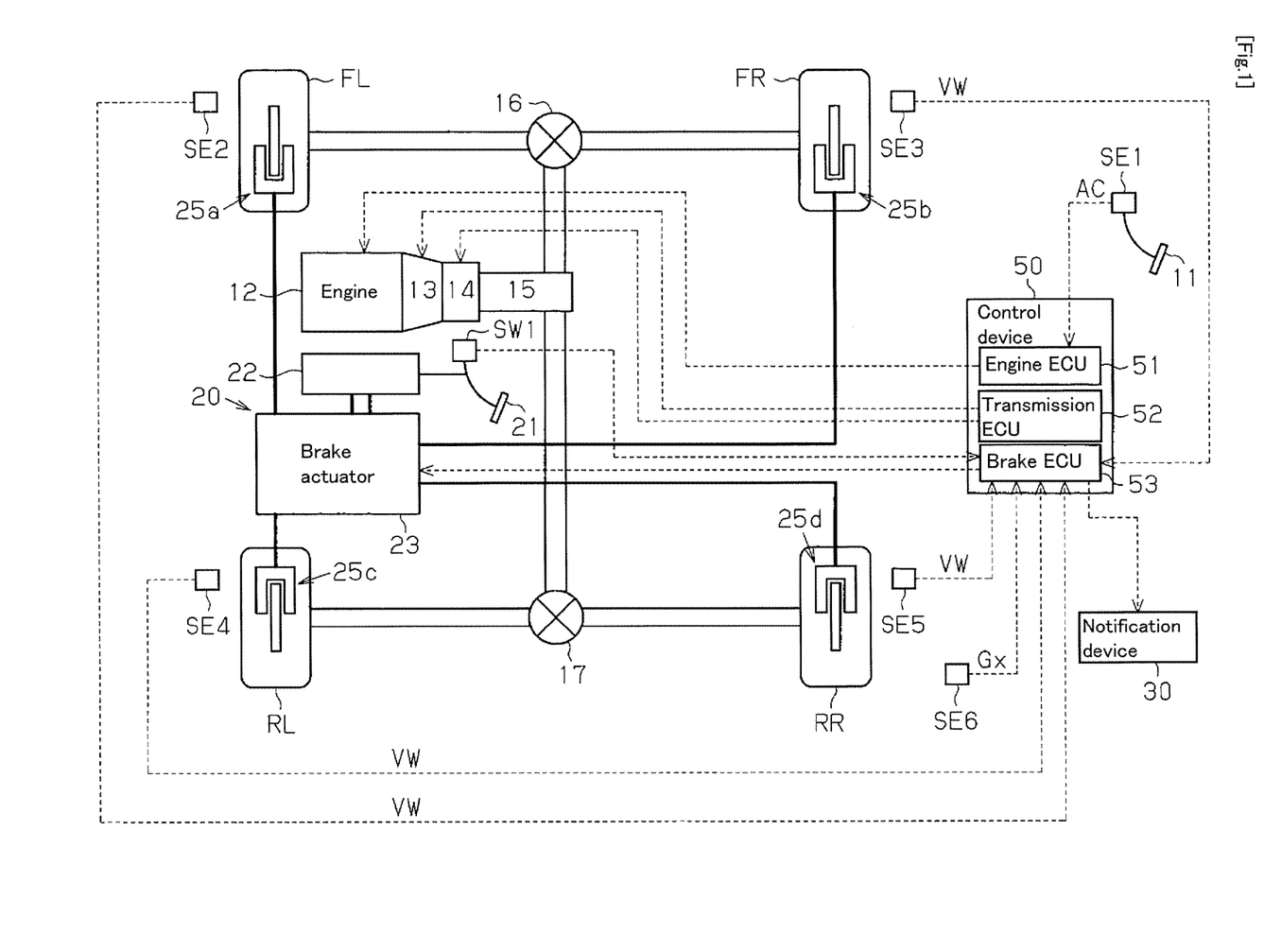
FIG. 1 is a schematic block diagram showing a vehicle including a control device according to an embodiment of a driving assistance device for a vehicle.

FIG. 1 shows a vehicle including a control device 50 serving as a driving assistance device for a vehicle according to the embodiment. As shown in FIG. 1, the vehicle is a 4-wheel-drive vehicle on which a left front wheel FL, a right front wheel FR, a left rear wheel RL, and a right rear wheel RR function as drive wheels.

The vehicle includes an engine 12 which outputs driving force depending on an operation amount of an accelerator pedal 11 obtained by a driver. The driving force output from the engine 12 is transmitted to a transfer 15 through a transmission 13 and a sub-transmission 14. Driving force distributed to a front wheel side by the transfer 15 is transmitted to the front wheels FL and FR through a front-wheel differential 16, and driving force distributed to a rear wheel side by the transfer 15 is transmitted to the rear wheels RL and RR through a rear-wheel differential 17. The accelerator pedal 11 is an example of an "accelerator operation member". In this specification, to operate the accelerator pedal 11 by the driver is called an "accelerator operation".

The sub-transmission 14 is a decelerator which switches driving force transmitted from the transmission 13 in two steps. Gear positions of the sub-transmission 14 are set to "H4" or "L4" by operating operation units such as a change-over switch and a change-over lever disposed in the vehicle. "H4" is a gear position used in normal driving, and "L4" is a gear position used when driving force of a vehicle is increased in driving on a punishing road or the like.

A vehicle braking device 20 has a fluid pressure generating device 22 which generates a fluid pressure depending on operation force of a brake pedal 21 by a driver and a brake actuator 23 which can independently adjust braking forces applied to the wheels FL, FR, RL, and RR. In this specification, to operate the brake pedal 21 by the driver is called a "brake operation".

Brake mechanisms 25a, 25b, 25c, and 25d corresponding to the wheels FL, FR, RL, and RR, respectively, are disposed on the vehicle. The brake mechanisms 25a to 25d give braking forces depending on fluid pressures generated in cylinders thereof to the wheels FL, FR, RL, and RR, respectively. More specifically, when the driver executes a brake operation, brake fluid the amount of which depends on a fluid pressure generated by the fluid pressure generating device 22 is supplied into the cylinders of the brake mechanisms 25a to 25d to increase the fluid pressures in the cylinders. When the brake actuator 23 is actuated, the brake actuator 23 adjusts the fluid pressures in the cylinders of the brake mechanisms 25a to 25d.

A notification device 30 to notify the driver of a vehicle state is disposed in the vehicle. For example, when vehicle downhill control (will be described later in detail) is executed, the notification device 30 notifies the driver that the control is being executed. As the notification device 30, a lamp, a loudspeaker, a display screen of a navigation device, or the like can be given.

The vehicle includes a brake switch SW1, an accelerator opening angle sensor SE1, wheel speed sensors SE2, SE3, SE4, and SE5 and a forward/backward acceleration sensor SE6. The brake switch SW1 detects whether the brake pedal 21 is operated. The accelerator opening angle sensor SE1 detects an accelerator opening angle AC corresponding to an accelerator operation amount serving as an operation amount of the accelerator pedal 11. The wheel speed sensors SE2 to SE5 are disposed for the wheels FL, FR, RL, and RR, respectively, and detect wheel speeds VW of the corresponding wheels, respectively. The forward/backward acceleration sensor SE6 detects a forward/backward acceleration Gx which is an acceleration in the forward/backward direction of the vehicle. Pieces of information detected by these detection systems are input to the control device 50.

The control device 50 includes an engine ECU 51 which controls the engine 12, a transmission ECU 52 which controls the transmission 13 and the sub-transmission 14, and a brake ECU 53 which controls the brake actuator 23. The ECUs 51 to 53 can mutually transmit and receive various pieces of information and various commands. The control device 50 is configured by a control circuit, and each of the ECUs is configured by a processor including, for example, a CPU, a ROM, a RAM, and an input/output port.

In the vehicle, as the driving assistance control, the brake actuator 23 is actuated to execute vehicle downhill control which adjusts braking force BP applied to the vehicle such that a vehicle body speed VS of the vehicle does not exceed a target speed VSTr set to an extra-low speed (for example, 5 km/h). The vehicle downhill control is control which assists a vehicle operation by the driver when the driver drives the vehicle on a dirt road which is an unpaved road surface or a low-μ road such as a snowy road. More specifically, when the vehicle downhill control is executed, the vehicle body speed VS of the vehicle is prevented from being excessively high. For this reason, the driver can concentrate on an operation of the steering wheel.

In this manner, even in execution of vehicle downhill control, the vehicle body speed VS of the vehicle can be adjusted by the brake operation or the accelerator operation. For example, in execution of the vehicle downhill control, the driver executes the accelerator operation to make it possible to increase the target speed VSTr. More specifically, the target speed VSTr is set as a sum of a set speed VSe and an additional amount Vp of a target speed depending on an accelerator operation aspect by the driver. The additional amount Vp easily becomes large when the accelerator opening angle AC corresponding to the accelerator operation amount is large.

The set speed VSe may be set to the vehicle body speed VS correlated with at least one wheel speed VW of the wheel speeds VW of the wheels FL, FR, RL, and RR. When braking force BP is applied as in execution of the vehicle downhill control, the vehicle body speed VS of the vehicle is calculated depending on the maximum wheel speed VW of the wheel speeds VW of the wheels FL, FR, RL, and RR (select high). More specifically, the vehicle body speed VS of the vehicle in execution of the vehicle downhill control is correlated with the maximum wheel speed VW of the wheel speeds VW of the wheels FL, FR, RL, and RR.

When an accelerator operation amount obtained by the driver decreases or the accelerator operation is canceled in execution of the vehicle downhill control, the target speed VSTr changes depending on whether the gear position of the sub-transmission 14 is "H4" or "L4". For example, in a case where the gear position of the sub-transmission 14 is "H4", when the accelerator operation amount by the driver begins to decrease, the target speed VSTr is kept at a target speed immediately before the decrease in accelerator operation amount begins. For this reason, even though the driver does not execute the accelerator operation, the vehicle body speed VS of the vehicle is prevented from decreasing.

For example, in a case where the gear position of the sub-transmission 14 is "L4", when the accelerator operation amount by the driver begins to decrease, the target speed VSTr may decrease according to a decrease in accelerator operation amount or may be changed to a reference target speed VSTrB. For this reason, when the driver does not execute the accelerator operation, the vehicle body speed VS of the vehicle decreases according to the decrease of the target speed VSTr.

Figure 2:
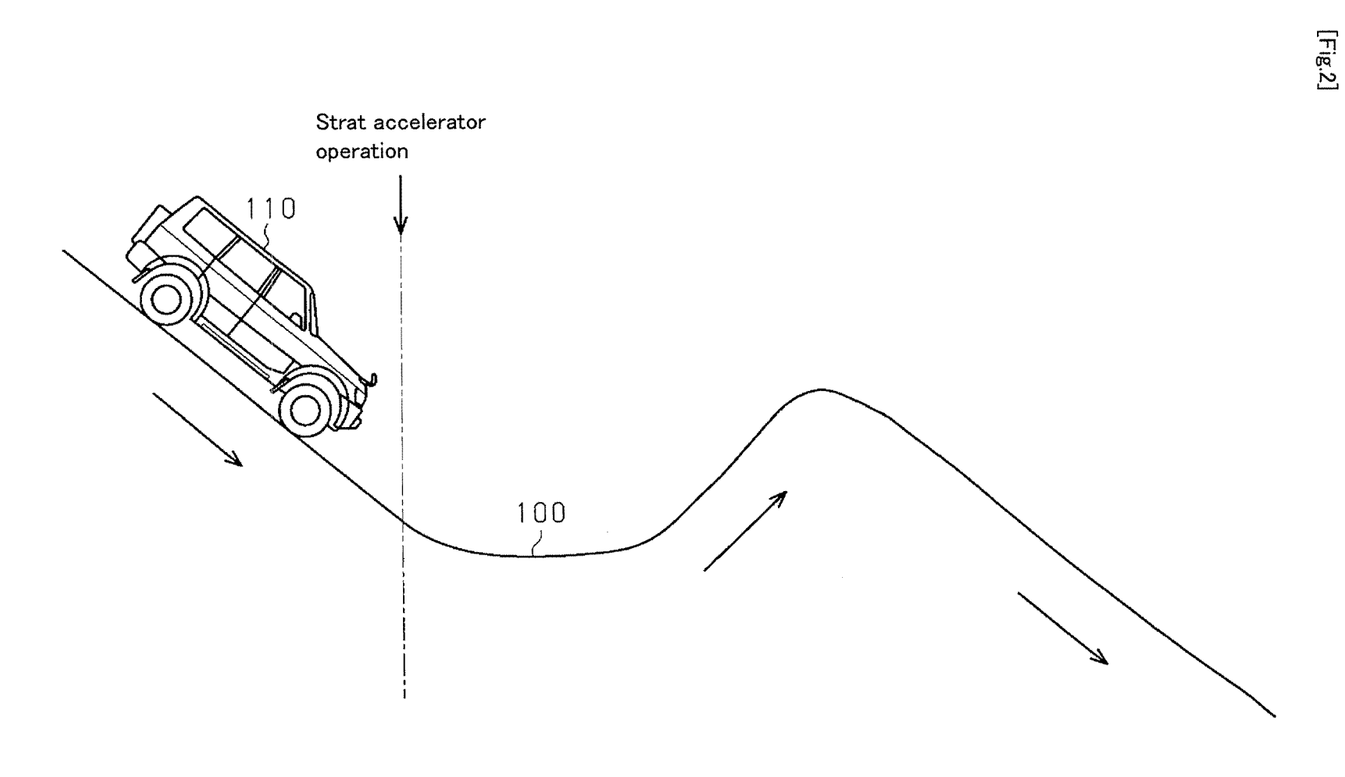
FIG. 2 is a schematic view showing an example of a vehicle driving on a dirt road.
Figure 3:
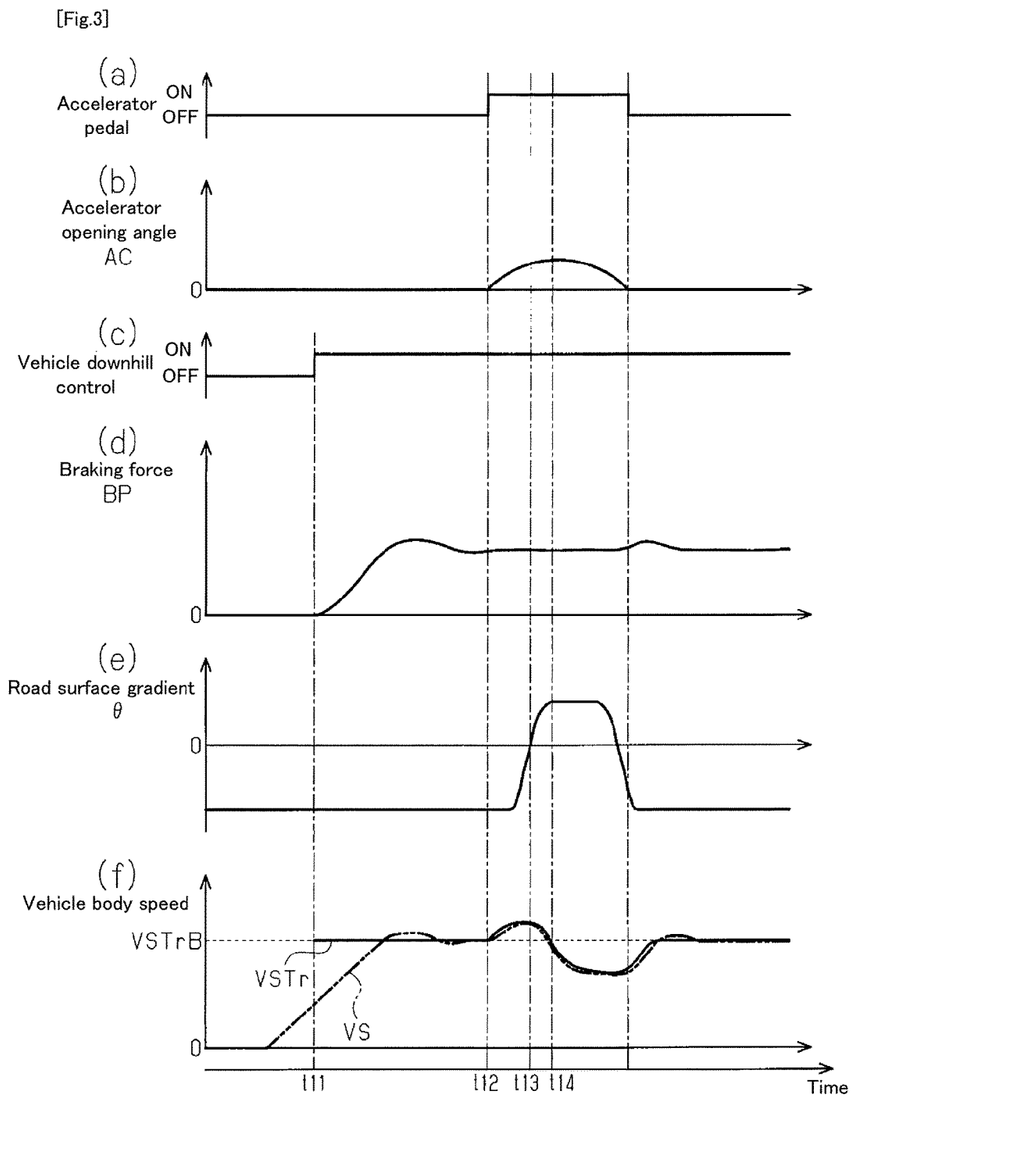
FIG. 3A shows a transition of operation aspects of an accelerator pedal.
FIG. 3B shows a transition of accelerator opening angles.
FIG. 3C shows a transition of embodiments of vehicle downhill control.
FIG. 3D shows a transition of braking force to the vehicle.
FIG. 3E shows a transition of road surface gradients serving as gradients of the road surface on which the vehicle drives.
FIG. 3F shows a transition of vehicle body speeds of the vehicle.

As shown in FIG. 2, on a dirt road 100, a downhill slope and a climbing road may be successive. When a vehicle 110 drives on a downhill slope, gravity acts in a direction in which the vehicle is accelerated. On the other hand, when the vehicle 110 drives on a climbing road, gravity acts in a direction in which the vehicle is decelerated. As a result, when the road surface on which the vehicle 110 drives changes from a downhill slope to a climbing road, the vehicle body speed VS of the vehicle easily decreases.

For this reason, in order to suppress deceleration when the vehicle 110 drives on the climbing road, the driver may start the accelerator operation before the driving road surface changes from the downhill slope to the climbing road. However, in a case where the braking force BP is applied to the vehicle 110 in execution of the vehicle downhill control, when the driver executes the accelerator operation, the braking force BP does not decrease despite the intention of the driver, and the vehicle body speed VS of the vehicle 110 driving on the climbing road may extremely decrease.

FIGS. 3A to 3F show examples of a timing chart when a driving road surface of a vehicle changes from a downhill slope to a climbing road. More specifically, as shown in FIGS. 3A, 3B, 3C, 3D, 3E, and 3F, when execution of the vehicle downhill control is started at first point of time t11 at which the vehicle drives on a downhill slope whose road surface gradient θ is negative, the braking force BP applied to the vehicle gradually increases such that the vehicle body speed VS of the vehicle increases at a constant gradient toward the target speed VSTr. When the vehicle body speed VS approximately reaches the target speed VSTr, the braking force BP acting on the vehicle is finely adjusted such that the vehicle body speed VS does not exceed the target speed VSTr. In a period from the first point of time t11 to second point of time t12 at which the accelerator operation is started, the target speed VSTr is set to the reference target speed VSTrB.

Thereafter, at the second point of time t12 before the driving road surface changes from the downhill slope to the climbing road, the driver starts the accelerator operation. At this time, when the driving road surface is still the downhill slope, the vehicle body speed VS of the vehicle increases according to an increase of the accelerator opening angle AC, and the set speed VSe increases according to an increase of the vehicle body speed VS. The target speed VSTr calculated depending on the set speed VSe also increases.

However, at third point of time t13 thereafter, when the road surface gradient θ switches from a negative value to a positive value, i.e., when the driving road surface changes into the climbing road, the vehicle body speed VS decreases. In this case, when the set speed VSe is determined depending on the vehicle body speed VS when the accelerator operation is being executed, the set speed VSe decreases according to the decrease of the vehicle body speed VS. As a result, the target speed VSTr calculated depending on the set speed VSe also decreases.

When a control configuration in which the sum of the set speed VSe and the additional amount Vp depending on the accelerator opening angle AC is set as the target speed VSTr is employed, the additional amount Vp becomes very small when the accelerator opening angle AC is very small. For this reason, although the driver executes the accelerator operation, the target speed VSTr may be lower than the reference target speed VSTrB as after fourth point of time t14.

When the additional amount Vp is very small as described above, the vehicle body speed VS of the vehicle rarely deviates from the target speed VSTr. For this reason, the braking force BP applied to the vehicle slightly decreases. As a result, despite of the intention of a driver executing an accelerator operation, the vehicle body speed VS of the vehicle driving on a climbing road may extremely decrease.

Thus, in the embodiment, when the driver executes the accelerator operation in execution of the vehicle downhill control, the target speed VSTr is prevented from being lower than a lower-limit speed VSMin equal to the reference target speed VSTrB. In this manner, when the vehicle in which the vehicle downhill control is executed drives on a climbing road, even though the driver executes an accelerator operation, the vehicle body speed VS of the vehicle is prevented from extremely decreasing.

In the embodiment, when the driver executes an accelerator operation, not only a second additional amount Vp2 depending on the accelerator opening angle AC, but also a first additional amount Vp1 depending on an operation duration TM serving as an example of a time for which the accelerator operation is executed are determined. A larger value of the first additional amount Vp1 and the second additional amount Vp2 is employed as the additional amount Vp. In this manner, even when the accelerator opening angle AC by the driver is small, the target speed VSTr easily increases, and the vehicle body speed VS of the vehicle appropriately increases.

A map used when the second additional amount Vp2 is determined will be described below with reference to FIG. 4.

Figure 4:
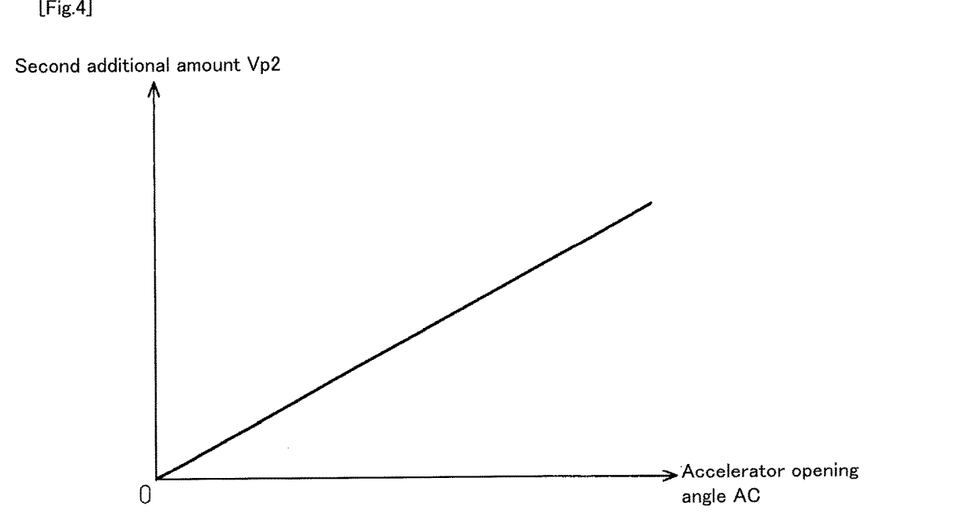
FIG. 4 is a map showing a relationship between an accelerator opening angle and a second additional amount.

As shown in FIG. 4, the larger the accelerator opening angle AC detected by the accelerator position sensor SE1, the larger the second additional amount Vp2.

Figure 5:
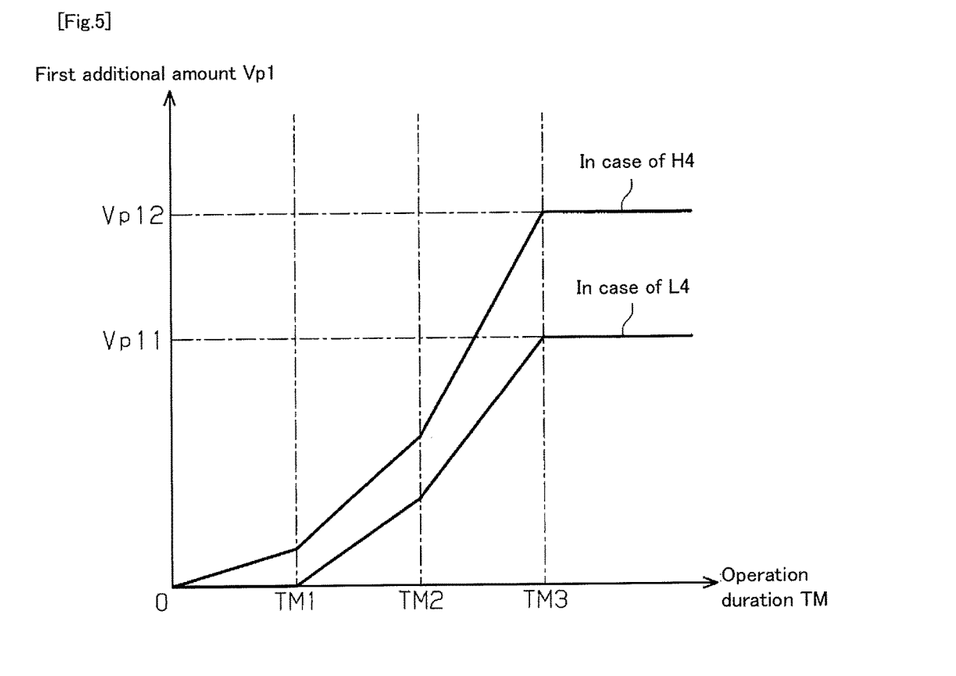
FIG. 5 is a map showing a relationship between an operation duration of an accelerator operation and a first additional amount.

A map used when the first additional amount Vp1 is determined will be described below with reference to FIG. 5. FIG. 5 shows a map obtained when the gear position of the sub-transmission 14 is "L4" and a map obtained when the gear position of the sub-transmission 14 is "H4". In FIG. 5, of first, second, and third operation durations TM1, TM2, and TM3, the first operation duration TM1 is shortest, the second operation duration TM2 is second short, and the third operation duration TM3 is longest.

As shown in FIG. 5, in the map for "L4", when the operation duration TM is "0 (zero)" or more and shorter than the first operation duration TM1, the first additional amount Vp1 is set to "0 (zero)". When the operation duration TM is equal to or longer than the third operation duration TM3, the first additional amount Vp1 is kept at a first specific additional amount Vp11.

When the operation duration TM is equal to or longer than the first operation duration TM1 and shorter than the third operation duration TM3, the first additional amount Vp1 is set such that, the longer the operation duration TM, the larger the first additional amount Vp1. A change gradient of the first additional amount Vp1 when the operation duration TM is equal to or longer than the second operation duration TM2 is larger than a change gradient of the first additional amount Vp1 when the operation duration TM is smaller than the second operation duration TM2. The "change gradient" is a value corresponding to an increment of the first additional amount Vp1 when the operation duration TM increases by a predetermined time. Thus, the target speed VSTr calculated based on the first additional amount Vp1 easily increases when the operation duration TM is long.

On the other hand, in the map for "H4", when the operation duration TM is equal to or longer than the third operation duration TM3, the first additional amount Vp1 is kept at a second specific additional amount Vp12 larger than the first specific additional amount Vp11. When the operation duration TM is "0 (zero)" or more and shorter than the third operation duration TM3, the first additional amount Vp1 is set such that, the longer the operation duration TM, the larger the first additional amount Vp1. However, the change gradient of the first additional amount Vp1 when the operation duration TM is equal to or longer than the first operation duration TM1 is larger than the change gradient of the first additional amount Vp1 when the operation duration TM is smaller than the first operation duration TM1. The change gradient of the first additional amount Vp1 when the operation duration TM is equal to or longer than the second operation duration TM2 is larger than the change gradient of the first additional amount Vp1 when the operation duration TM is smaller than the second operation duration TM2. Thus, even though the gear position of the sub-transmission 14 is "H4", the target speed VSTr calculated based on the first additional amount Vp1 easily increases when the operation duration TM is long.

A processing routine executed by the brake ECU 53 in execution of the vehicle downhill control will be described below with reference to the flow chart shown in FIG. 6. The processing routine is a processing routine executed in a preset control cycle.

Figure 6:
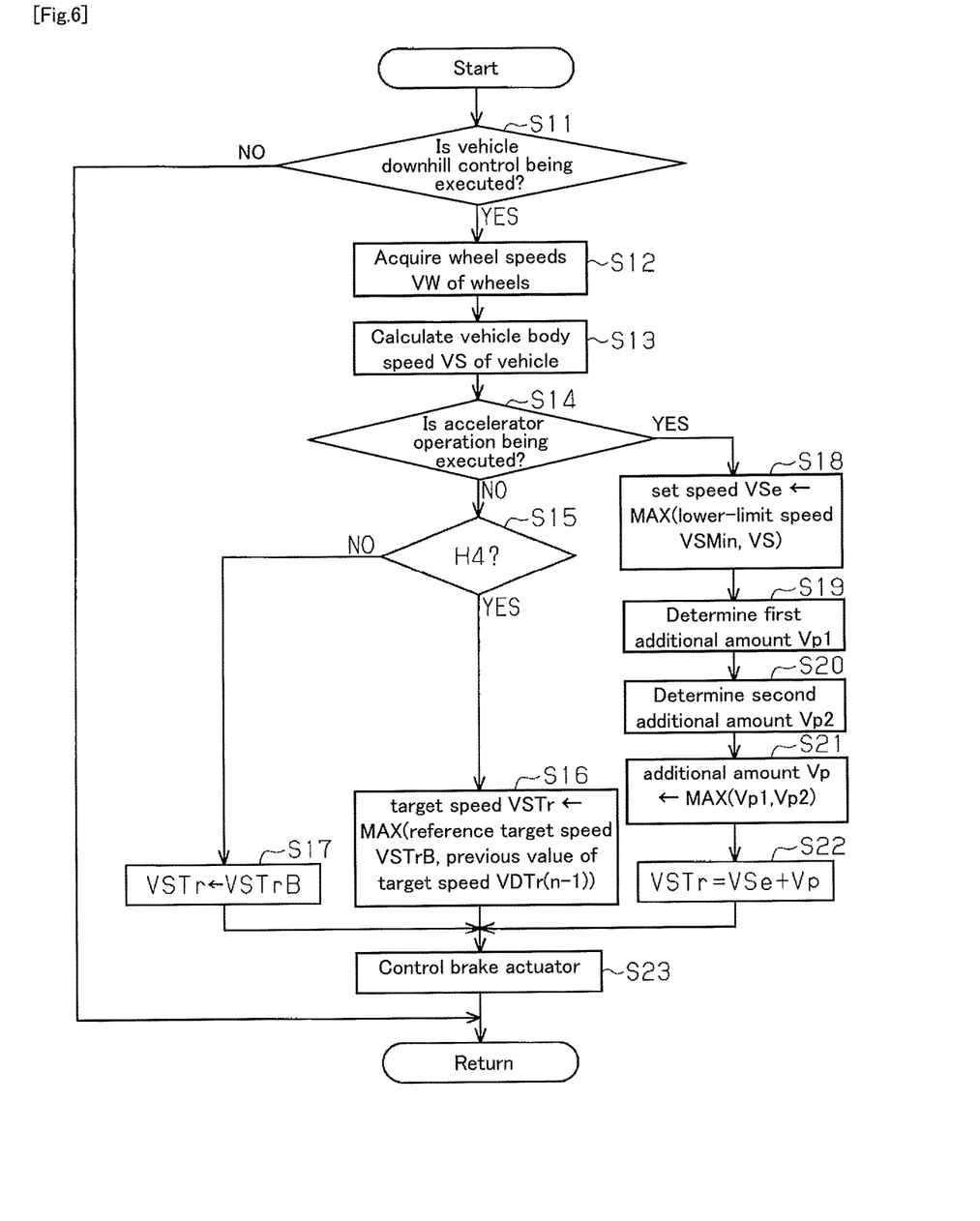
FIG. 6 is a flow chart for explaining a processing routine executed in execution of vehicle downhill control.
Figure 7:
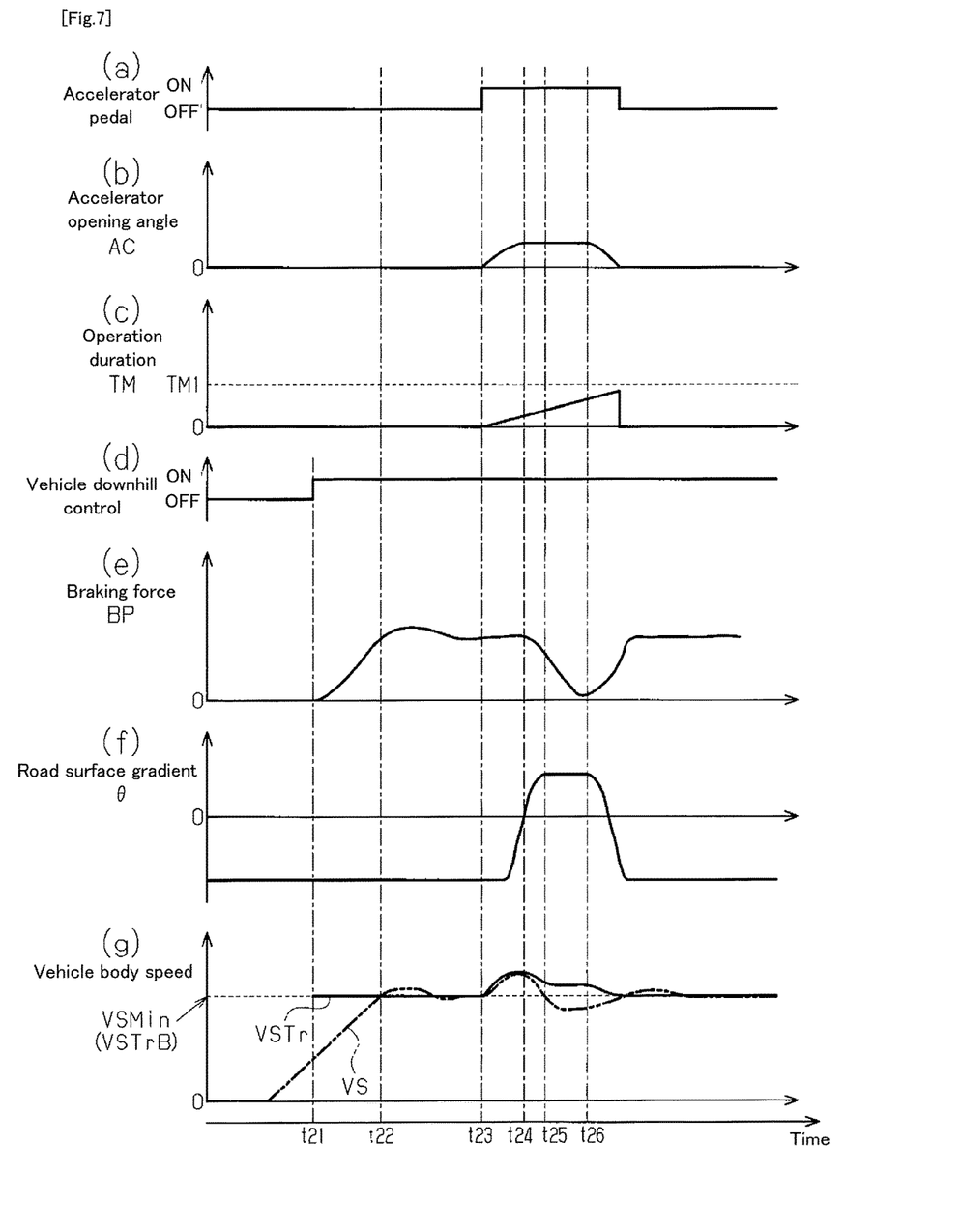
FIG. 7A shows a transition of operation aspects of an accelerator pedal.
FIG. 7B shows a transition of accelerator opening angles.
FIG. 7C shows a transition of operation durations.
FIG. 7D shows a transition of embodiments of vehicle downhill control.
FIG. 7E shows a transition of braking force to the vehicle.
FIG. 7F shows a transition of road surface gradients serving as gradients of the road surface on which the vehicle drives.
FIG. 7G shows a transition of vehicle body speeds of the vehicle.
Figure 8:
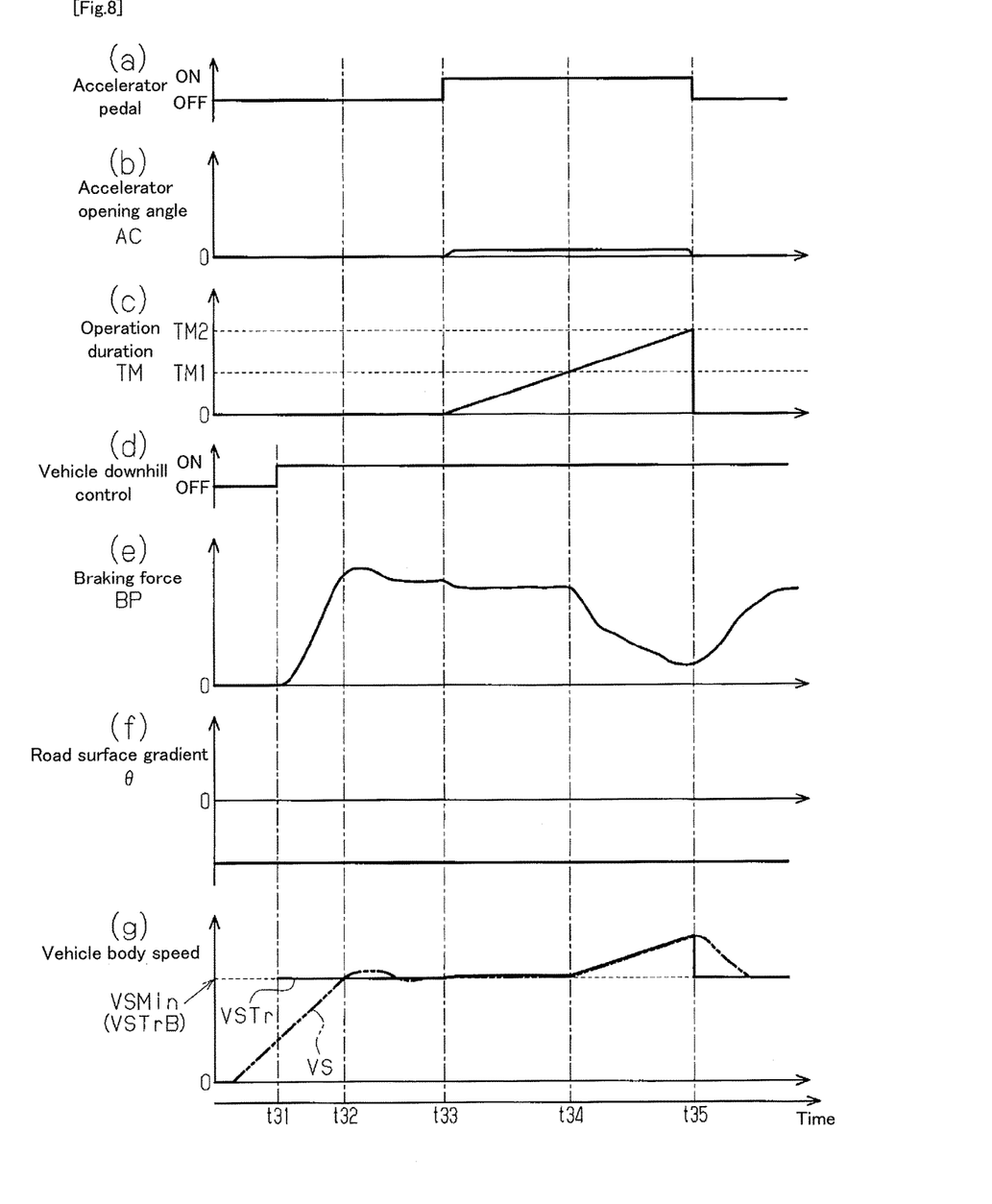
FIG. 8A shows a transition of operation aspects of an accelerator pedal.
FIG. 8B shows a transition of accelerator opening angles.
FIG. 8C shows a transition of operation durations.
FIG. 8D shows a transition of embodiments of vehicle downhill control.
FIG. 8E shows a transition of braking force to the vehicle.
FIG. 8F shows a transition of road surface gradients serving as gradients of the road surface on which the vehicle drives.
FIG. 8G shows a transition of vehicle body speeds of the vehicle.

As shown in FIG. 6, in this processing routine, the brake ECU 53 determines whether the vehicle downhill control is being executed (step S11). When the vehicle downhill control is not executed (step S11: NO), the brake ECU 53 temporarily ends the processing routine. On the other hand, the vehicle downhill control is executed (step S11: YES), the brake ECU 53 acquires the wheel speeds VW of the wheels FL, FR, RL, and RR detected by the wheel speed sensors SE2 to SE5 (step S12). Subsequently, the brake ECU 53 calculates the vehicle body speed VS based on the maximum wheel speed VW of the wheel speeds VW of the wheels FL, FR, RL, and RR (step S13). More specifically, in step S13, the vehicle body speed VS correlated with the maximum wheel speed VW of the wheel speeds VW of the wheels FL, FR, RL, and RR is calculated.

The brake ECU 53 determines, on the basis of the accelerator opening angle AC detected by the accelerator position sensor SE1, whether the accelerator operation is executed (step S14). For example, the brake ECU 53 may determines that the accelerator operation is executed when the accelerator opening angle AC is equal to or larger than a predetermined opening-angle threshold value. When the accelerator operation is not executed (step S14: NO), the brake ECU 53 determines whether the gear position of the sub-transmission 14 is "H4" (step S15). When the gear position of the sub-transmission 14 is "H4" (step S15: YES), the brake ECU 53 shifts the process to next step S16. When the target speed VSTr calculated by the previous control cycle is set to a previous value VSTr(n−1) of the target speed, in step S16, the brake ECU 53 sets a larger value of the reference target speed VSTrB and the previous value VSTr(n−1) of the target speed as the target speed VSTr. The brake ECU 53 shifts the process to step S23 (will be described later).

On the other hand, when the gear position of the sub-transmission 14 is "L4" (step S15: NO), the brake ECU 53 sets the target speed VSTr as the reference target speed VSTrB (step S17). The brake ECU 53 shifts the process to step S23 (will be described later).

On the other hand, in step S14, when an accelerator operation is executed (YES), the brake ECU 53 sets a larger value of the lower-limit speed VSMin and the vehicle body speed VS calculated in step S13 as the set speed VSe (step S18). Thus, in the embodiment, the brake ECU 53 also functions as a "set speed determination unit" which determines the set speed VSe depending on a larger value of the vehicle body speed VS correlated with at least one wheel speed of the wheel speeds VW of the wheels FL, FR, RL, and RR and the lower-limit speed VSMin when an accelerator operation is executed in a situation where the vehicle downhill control is executed.

The brake ECU 53 uses the map shown in FIG. 5 to determine the first additional amount Vp1 depending on the operation duration TM (step S19). At this time, the brake ECU 53 uses the map for "H4" when the gear position of the sub-transmission 14 is "H4" to determine the first additional amount Vp1. On the other hand, the brake ECU 53 uses the map for "L4" when the gear position of the sub-transmission 14 is "L4" to determine the first additional amount Vp1. Thus, in this regard, in the embodiment, the brake ECU 53 also functions as a "time determination unit" which determines the first additional amount Vp1 such that, the longer the operation duration TM, the larger the first additional amount Vp1.

The brake ECU 53 uses the map shown in FIG. 4 to determine the second additional amount Vp2 depending on the accelerator opening angle AC (step S20). Thus, in this regard, in the embodiment, the brake ECU 53 also functions as an "operation amount determination unit" which determines the second additional amount Vp2 such that, the larger the accelerator opening angle AC in a situation where the vehicle downhill control is executed, the larger the second additional amount Vp2. The brake ECU 53 sets a larger value of the first additional amount Vp1 determined in step S19 and the second additional amount Vp2 determined in step S20 as the additional amount Vp (step S21). Thus, in the embodiment, the brake ECU 53 also functions as an "additional amount determination unit" which determines the additional amount Vp depending on an operation aspect of the accelerator pedal 11.

Subsequently, the brake ECU 53 sets a sum of the set speed VSe calculated in step S18 and the additional amount Vp calculated in step S21 as the target speed VSTr (step S22). Thus, in the embodiment, the brake ECU 53 also functions as a "target speed determination unit". The brake ECU 53 shifts the process to next step S23.

In step S23, the brake ECU 53 actuates the brake actuator 23 to adjust the braking force BP applied to the vehicle depending on the vehicle body speed VS of the vehicle and the target speed VSTr. More specifically, the brake ECU 53 actuates the brake actuator 23 to decrease the braking force BP applied to the vehicle when the vehicle body speed VS is increased. On the other hand, the brake ECU 53 actuates the brake actuator 23 to increase the braking force BP applied to the vehicle when the vehicle body speed VS is decreased. Thus, in this regard, in the embodiment, the brake ECU 53 also functions as a "braking control unit". Thereafter, the brake ECU 53 temporarily ends the processing routine.

An operation obtained when a road surface on which a vehicle drives changes from a downhill slope to a climbing road will be described below with reference to the timing charts shown in FIGS. 7A to 7G.

As shown in FIGS. 7A, 7B, 7C, 7D, 7E, 7F, and 7G, the vehicle downhill control is started at a first point of time t21 at which the vehicle drives on the downhill slope. At this time, in execution of the vehicle downhill control, the braking force BP applied to the vehicle is adjusted such that the vehicle body speed VS of the vehicle does not exceed the target speed VSTr. At second point of time t22 at which an accelerator operation has not been executed yet, the vehicle body speed VS reaches the target speed VSTr at the point of time, i.e., the reference target speed VSTrB.

At third point of time t23 before the road surface on which the vehicle drives changes from the downhill slope to the climbing road, the accelerator operation is started. The accelerator opening angle AC at this time is relatively large. More specifically, the second additional amount Vp2 determined depending on the accelerator opening angle AC is larger than the first additional amount Vp1 determined depending on the operation duration TM. For this reason, the target speed VSTr which is the sum of the set speed VSe and the additional amount Vp is set to increase depending on the increase of the accelerator opening angle AC (step S18 to S22). At this time, the vehicle body speed VS of the vehicle increases with the increase of the target speed VSTr.

At fourth point of time t24 thereafter, when the road surface on which the vehicle drives changes to a climbing road, the vehicle body speed VS of the vehicle begins to decrease. At this time, since the set speed VSe is higher than the lower-limit speed VSMin at the fourth point of time t24, the set speed VSe decreases according to a decrease of the vehicle body speed VS (step S18). At this time, although the accelerator opening angle AC has not decreased yet, the target speed VSTr decreases (step S22).

In this case, the target speed VSTr is a sum of the set speed VSe and the additional amount Vp (in this case, the second additional amount Vp2). For this reason, a difference depending on the accelerator opening angle AC is generated between the target speed VSTr and the vehicle body speed VS, and the braking force BP applied to the vehicle begins to decrease.

After the fourth point of time t24, the accelerator opening angle AC is kept. At fifth point of time t25 thereafter, although the vehicle body speed VS becomes lower than the lower-limit speed VSMin also serving as the reference target speed VSTrB, the set speed VSe is kept at the lower-limit speed VSMin (step S18). More specifically, the target speed VSTr is not lower than the lower-limit speed VSMin (step S22). As a result, a difference obtained by subtracting the vehicle body speed VS from the target speed VSTr increases, and the braking force BP applied to the vehicle by actuation of the brake actuator 23 considerably decreases (step S23). In this manner, the vehicle body speed VS does not easily decrease when the vehicle is driving on a climbing road.

After sixth point of time t26, the braking force BP applied to the vehicle sufficiently decreases, and the gradient of the climbing road gradually decreases. For this reason, the vehicle body speed VS gradually increases toward the target speed VSTr. The accelerator opening angle AC gradually decreases, and the target speed VSTr gradually decreases. As a result, since the difference between the target speed VSTr and the vehicle body speed VS gradually decreases, the brake actuator 23 actuates to gradually increase the braking force BP applied to the vehicle (step S23). More specifically, in the embodiment, the vehicle can climb up to the climbing road while suppressing considerable decrease of the vehicle body speed VS.

An operation obtained when a driver executes an accelerator operation when a vehicle drives on a downhill slope will be described below with reference to the timing charts shown in FIGS. 8A to 8G. It is assumed that the gear position of the sub-transmission 14 is "L4" and the accelerator opening angle AC is very small.

As shown in FIGS. 8A, 8B, 8C, 8D, 8E, 8F, and 8G, the vehicle downhill control is started at first point of time t31 at which the vehicle drives on the downhill slope. At this time, in execution of the vehicle downhill control, the braking force BP applied to the vehicle is adjusted such that the vehicle body speed VS of the vehicle does not exceed the target speed VSTr. At second point of time t32 at which an accelerator operation has not been executed yet, the vehicle body speed VS reaches the target speed VSTr at the point of time, i.e., the reference target speed VSTrB.

At third point of time t33, an accelerator operation by a driver is started (step S14: YES). For this reason, measurement of the operation duration TM is started from this third point of time t33. In a period from the third point of time t33 to fourth point of time t34 at which the operation duration TM reaches the first operation duration TM1, the first additional amount Vp1 determined depending on the operation duration TM is "0 (zero)" (step S19). For this reason, in this period, the second additional amount Vp2 determined depending on the accelerator opening angle AC is larger than the first additional amount Vp1. Thus, the target speed VSTr is set as a sum of the set speed VSe and the second additional amount Vp2 (steps S20 to S22).

In this case, since the second additional amount Vp2 determined depending on the accelerator opening angle AC is very small, even though the driver executes the accelerator operation, the target speed VSTr scarcely increases. For this reason, the vehicle body speed VS of the vehicle scarcely increases.

However, at the fourth point of time t34 thereafter, the operation duration TM reaches the first operation duration TM1. For this reason, after the fourth point of time t34, the first additional amount Vp1 gradually increases with an increase of the operation duration TM1. When the first additional amount Vp1 is larger than the second additional amount Vp2, the target speed VSTr is set as a sum of the set speed VSe and the first additional amount Vp1 (steps S19, S21, and S22). More specifically, even though the accelerator opening angle AC is very small, the driver continues the accelerator operation to gradually increase the target speed VSTr.

As a result, when the target speed VSTr increases, the braking force BP applied to the vehicle by actuation of the brake actuator 23 decreases (step S23). As a result, the vehicle body speed VS of the vehicle is set to increase like the target speed VSTr.

Thereafter, when the accelerator operation is canceled at fifth point of time t35, since the gear position of the sub-transmission 14 is "L4", the target speed VSTr is set as the reference target speed VSTrB (step S17). At this time, the braking force BP applied to the vehicle is increased by actuation of the brake actuator 23, and the vehicle body speed VS gradually decreases toward the target speed VSTr.

As described above, according to the configurations and the operations, the following advantageous effects can be obtained.

(1) When the driver executes the accelerator operation in execution of the vehicle downhill control, the target speed VSTr is set such that, the longer the operation duration TM, the higher the target speed VSTr. For this reason, even though the accelerator opening angle AC is small, the accelerator operation is continuously executed to make it possible to increase the vehicle body speed VS of the vehicle. Thus, the vehicle body speed VS of the vehicle can be appropriately increased when the driver executes the accelerator operation even in a situation where the braking force BP is being applied to the vehicle in execution of the vehicle downhill control.

(2) It can be determined that the longer the operation duration TM, the higher the vehicle body speed required by the driver. At this time, in the embodiment, the change gradient of the target speed VSTr is set such that, the longer the operation duration TM, the larger the change gradient. More specifically, in the map shown in FIG. 5, the longer the operation duration TM, the larger the change gradient of the first additional amount Vp1. For this reason, the vehicle can be driven at the vehicle body speed VS depending on the intention of the driver.

(3) In this embodiment, a larger value of the first additional amount Vp1 depending on the operation duration TM and the second additional amount Vp2 depending on the accelerator opening angle AC is set as the additional amount Vp, and a sum of the additional amount Vp and the set speed VSe is set as the target speed VSTr. When an accelerator operation amount by the driver is small, the second additional amount Vp2 does not easily become larger than the first additional amount Vp1. When the first additional amount Vp1 is larger than the second additional amount Vp2, the target speed VSTr is set such that, the longer the operation duration TM, the higher the target speed VSTr. Thus, even though the accelerator operation amount by the driver is small, the driver continuously executes the accelerator operation to make it possible to increase the vehicle body speed VS of the vehicle little by little.

(4) On the other hand, when an accelerator operation amount by the driver is large, the second additional amount Vp2 easily becomes larger than the first additional amount Vp1. When the second additional amount Vp2 is larger than the first additional amount Vp1, the target speed VSTr is set such that, the higher the target speed VSTr, the larger the accelerator operation amount. For this reason, when the accelerator operation amount by the driver is large, the vehicle body speed VS of the vehicle can be rapidly increased according to the request of the driver.

(5) When the driver executes the accelerator operation in execution of the vehicle downhill control, the set speed VSe does not become lower than the lower-limit speed VSMin. For this reason, even though a road surface on which the vehicle drives changes from a downhill slope to a climbing road, the target speed VSTr calculated depending on the set speed VSe does not become lower than the lower-limit speed VSMin. For this reason, when the road surface on which the vehicle drives changes from a downhill slope to a relatively steep climbing road, the vehicle body speed VS easily becomes lower than the target speed VSTr. When the vehicle body speed VS becomes lower than the target speed VSTr, the braking force BP applied to the vehicle by actuation of the brake actuator 23 decreases. As a result, the vehicle body speed VS does not easily decrease. Thus, when the road surface on which the vehicle drives changes from a downhill slope to a climbing road in a situation where braking force BP is being applied to the vehicle in execution of the vehicle downhill control, the vehicle can be caused to drive on the climbing road while suppressing considerable decrease of the vehicle body speed VS.

(6) In this embodiment, the lower-limit speed VSMin is set to a value equal to the reference target speed VSTrB. For this reason, when the driver executes an accelerator operation in execution of the vehicle downhill control, the braking force BP applied to the vehicle decreases when the vehicle body speed VS is smaller than the reference target speed VSTrB. As a result, a difference obtained by subtracting the vehicle body speed VS from the reference target speed VSTrB does not easily increase. More specifically, the vehicle can be caused to drive on the climbing road while suppressing considerable decrease of the vehicle body speed VS.

The above-described embodiment may be changed into another embodiment described below.

The set speed VSe obtained in execution of the accelerator operation may be the vehicle body speed VS calculated depending on at least one wheel speed of the wheel speeds VW of the wheels FL, FR, RL, and RR or a value depending on the vehicle body speed VS. As the value depending on the vehicle body speed VS, a value obtained by adding a predetermined value to the vehicle body speed VS, a value obtained by subtracting a predetermined value from the vehicle body speed VS, or the like may be given. Even though the set speed VSe is determined as described above, when the accelerator opening angle AC is small, the longer the operation duration TM, the larger the first additional amount Vp1. For this reason, the target speed VSTr can be increased depending on a time for which the accelerator operation is executed by the driver. Thus, the same effects as the advantageous effects (1) to (4) of the above-described embodiment can be obtained.

The second additional amount Vp2 depending on the accelerator opening angle AC need not be calculated. In this case, regardless of the magnitude of the accelerator opening angle AC, the target speed VSTr is set as a sum of the set speed VSe and the first additional amount Vp1. Even in this case, the same effects as the advantageous effects (1) and (2) of the above-described embodiment can be obtained.

When the second additional amount Vp2 is not calculated, the first additional amount Vp1 determined depending on the operation duration TM1 is multiplied by a correction gain set to be large when the accelerator opening angle AC is large, and the product may be set as the additional amount Vp. Thus, a sum of the additional amount Vp and the set speed VSe is set as the target speed VSTr. When the control configuration is employed, when the accelerator opening angle AC is large, the vehicle body speed VS can be early increased according to the accelerator opening angle AC.

In the above-described embodiment, the change gradient of the first additional amount Vp1 is set such that, the larger the change gradient, the longer the operation duration TM. However, the change gradient of the first additional amount Vp1 may be set to a constant value independently of the length of the operation duration TM. In this case, when the accelerator opening angle AC is small, the vehicle body speed VS increases at a constant gradient when the operation duration TM becomes longer.

In the above-described embodiment, as an operation time which is a time for which the accelerator operation is executed in execution of the vehicle downhill control, the operation duration TM which is a time for which the accelerator operation is continuously executed is employed. For this reason, when the driver temporarily stops the accelerator operation in execution of the vehicle downhill control, the operation duration TM is reset to "0 (zero)". In contrast to this, as the operation time, the operation duration TM is not employed, and a total sum of times for which the driver executes the accelerator operation in execution of the vehicle downhill control may be employed. In this case, in execution of one vehicle downhill control, even though the driver stops the accelerator operation, the operation time is not reset. For example, when the driver executes the accelerator operation twice in execution of one vehicle downhill control, a total sum of the duration of the first accelerator operation and the duration of the second accelerator operation is set as an operation time. In this case, when the gear position of the sub-transmission 14 is "H4", the target speed VSTr can be increased when the number of times of the accelerator operation increases.

When braking force BP is applied to the vehicle in execution of the vehicle downhill control, as long as the vehicle body speed VS is calculated depending on at least one wheel speed of the wheel speeds VW of the wheels FL, FR, RL, and RR, the vehicle body speed VS may be calculated by an arbitrary method. For example, the vehicle body speed VS may be calculated depending on an average value of the wheel speeds VW of the wheels FL, FR, RL, and RR, or the vehicle body speed VS may be calculated depending on the second largest wheel speed VW.

When the road surface on which the vehicle drives changes from a downhill slope to a climbing road in execution of the vehicle downhill control, the braking force BP applied to the vehicle decreases. When the vehicle body speed VS is lower than the target speed VSTr even though the braking force BP becomes "0 (zero)", an output from the engine 12 may be increased to approximate the vehicle body speed VS to the target speed VSTr. In this case, the brake ECU 53 transmits an instruction representing that the output from the engine 12 is increased to the engine ECU 51.

The lower-limit speed VSMin may be a value higher than the reference target speed VSTrB. Also in this case, when the driver executes the accelerator operation in execution of the vehicle downhill control, the braking force BP applied to the vehicle decreases when the vehicle body speed VS is smaller than the target speed VSTr. As a result, the vehicle body speed VS does not easily become lower than the reference target speed VSTrB. For this reason, the vehicle body speed VS can be prevented from extremely decreasing when the vehicle is driving on a climbing road.

The lower-limit speed VSMin may be a value lower than the reference target speed VSTrB.

The lower-limit speed VSMin may be made variable depending on driving situations for a vehicle. For example, when the road surface gradient θ which is a gradient of a road surface on which the vehicle drives is large, the lower-limit speed VSMin may be increased. For example, when the vehicle drives at an extremely low speed as in execution of the vehicle downhill control, the road surface gradient θ can be estimated based on the forward/backward acceleration Gx detected by the forward/backward acceleration sensor SE6.

When the lower-limit speed VSMin is made variable depending on the road surface gradient θ as described above, whether a climbing road connected to a downhill slope is steep or moderate, the braking force BP applied to the vehicle can be appropriately decreased when an accelerator operation is executed in a situation where the vehicle downhill control is executed. In particular, when the gradient of the climbing road is large, a difference obtained by subtracting the vehicle body speed VS from the target speed VSTr easily increases, and the braking force BP applied to the vehicle rapidly decreases. As a result, when the vehicle drives on a climbing road, the vehicle body speed VS of the vehicle is prevented from extremely decreasing. Thus, the vehicle can be caused to drive on the climbing road while suppressing considerable decrease of the vehicle body speed VS.

The set speed VSe obtained in execution of the accelerator operation may be a value depending on the vehicle body speed VS calculated depending on at least one wheel speed of the wheel speeds VW of the wheels FL, FR, RL, and RR or a value depending on the lower-limit speed VSMin. As the value depending on the vehicle body speed VS, a value obtained by adding a predetermined value to the vehicle body speed VS, a value obtained by subtracting a predetermined value from the vehicle body speed VS, or the like can be given. As the value depending on the lower-limit speed VSMin, a value obtained by adding a predetermined value to the lower-limit speed VSMin, a value obtained by subtracting a predetermined value from the lower-limit speed VSMin, or the like may be given.

An accelerator operation member may have an arbitrary shape (for example, an accelerator lever) other than that of the accelerator pedal 11.

Technical ideas which can be conceived from the embodiment and the other embodiment will be additionally described below.

(A) The driving assistance device for a vehicle described in claim 5 may include a set speed determination unit which determines the set speed depending on a vehicle body speed correlated with the maximum wheel speed of the wheel speeds of a plurality of wheels mounted on the vehicle when the accelerator operation is executed.

The invention claimed is:

1. A driving assistance device for a vehicle comprising:
a braking control unit which actuates a brake actuator to prevent the vehicle body speed of a vehicle from exceeding a target speed so as to adjust braking force to be applied to the vehicle;
a target speed determination unit which, in cases where the accelerator operation is being executed in a state where the braking control unit is executing the driving assistance control, determines a target speed such that, the longer an operation time which is a time for which the accelerator operation is executed, the higher the target speed; and
a time determination unit which determines an additional amount of the target speed such that, the longer the operation time, the larger the additional amount,
wherein the target speed determination unit determines a sum of the additional amount of the target speed determined by the time determination unit and the determined set speed as the target speed.

2. The driving assistance device for a vehicle according to claim 1, wherein the target speed determination unit determines an increase of the target speed per unit time such that, the longer the operation time, the larger the increase of the target speed.

3. A driving assistance device for a vehicle comprising:
a braking control unit which actuates a brake actuator to prevent the vehicle body speed of a vehicle from exceeding a target speed so as to adjust braking force to be applied to the vehicle;
a target speed determination unit which, in cases where the accelerator operation is being executed in a state where the braking control unit is executing the driving assistance control, determines a target speed such that, the longer an operation time which is a time for which the accelerator operation is executed, the higher the target speed;

a time determination unit which determines a first additional amount serving as an additional amount of the target speed such that, the longer the operation time, the larger the first additional amount; and an operation amount determination unit which determines a second additional amount serving as an additional amount of the target speed such that, the larger an accelerator operation amount in a state where the braking control unit is executing the driving assistance control, the larger the second additional amount, wherein the target speed determination unit determines a sum of a larger additional amount of the first additional amount determined by the time determination unit and the second additional amount determined by the operation amount determination unit and the determined set speed as the target speed.

4. The driving assistance device for a vehicle according to claim 1, further comprising a set speed determination unit which determines the set speed depending on a larger value of a vehicle body speed correlated with at least one wheel speed of wheel speeds of a plurality of wheels mounted on the vehicle and a set lower-limit speed when an accelerator operation is executed.

5. The driving assistance device for a vehicle according to claim 2, further comprising a set speed determination unit which determines the set speed depending on a larger value of a vehicle body speed correlated with at least one wheel speed of wheel speeds of a plurality of wheels mounted on the vehicle and a set lower-limit speed when an accelerator operation is executed.

6. The driving assistance device for a vehicle according to claim 3, further comprising a set speed determination unit which determines the set speed depending on a larger value of a vehicle body speed correlated with at least one wheel speed of wheel speeds of a plurality of wheels mounted on the vehicle and a set lower-limit speed when an accelerator operation is executed.

7. The driving assistance device for a vehicle according to claim 1, wherein the operation time is a duration of continuous operation of the accelerator.

8. The driving assistance device for a vehicle according to claim 2, wherein the operation time is a duration of continuous operation of the accelerator.

9. The driving assistance device for a vehicle according to claim 3, wherein the operation time is a duration of continuous operation of the accelerator.

10. The driving assistance device for a vehicle according to claim 4, wherein the operation time is a duration of continuous operation of the accelerator.

11. The driving assistance device for a vehicle according to claim 5, wherein the operation time is a duration of continuous operation of the accelerator.

12. The driving assistance device for a vehicle according to claim 6, wherein the operation time is a duration of continuous operation of the accelerator.

13. A driving assistance device for a vehicle comprising:
an electric control unit configured to:
execute driving assistance control by actuating a brake actuator to prevent a vehicle body speed of a vehicle from exceeding a target speed so as to adjust braking force to be applied to the vehicle;
determine the target speed, in cases where accelerator operation is being executed in a state where the driving assistance control is being executed, such that, the longer an operation time which is a time for which the accelerator operation is executed, the higher the target speed; and
determine an additional amount of the target speed such that, the longer the operation time, the larger the additional amount, wherein a sum of the additional amount of the target speed and a determined set speed is determined as the target speed.

* * * * *